US012569828B2

(12) United States Patent
Shimano et al.

(10) Patent No.: US 12,569,828 B2
(45) Date of Patent: Mar. 10, 2026

(54) OXYGEN-ABSORBING FILM

(71) Applicant: TOYO SEIKAN GROUP HOLDINGS, LTD., Tokyo (JP)

(72) Inventors: Kaori Shimano, Yokohama (JP); Tomohiro Miyai, Yokohama (JP); Hiroki Komagata, Yokohama (JP); Takahiro Akahane, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 541 days.

(21) Appl. No.: 18/151,719

(22) Filed: Jan. 9, 2023

(65) Prior Publication Data

US 2023/0158473 A1     May 25, 2023

Related U.S. Application Data

(63) Continuation of application No. PCT/JP2021/026746, filed on Jul. 16, 2021.

(30) Foreign Application Priority Data

Sep. 28, 2020     (JP) ................................. 2020-162600

(51) Int. Cl.
*B01J 20/26*          (2006.01)
*B01J 20/28*          (2006.01)
(Continued)

(52) U.S. Cl.
CPC ....... *B01J 20/262* (2013.01); *B01J 20/28004* (2013.01); *B01J 20/28035* (2013.01);
(Continued)

(58) Field of Classification Search
CPC ................ B01J 20/262; B01J 20/28004; B01J 20/28035; B32B 7/02; B32B 7/022;
(Continued)

(56) References Cited

U.S. PATENT DOCUMENTS 6,045,902 A     4/2000  Imanishi et al.
6,054,209 A     4/2000  Imanishi et al.
(Continued)

FOREIGN PATENT DOCUMENTS

CN         1516667 A        7/2004
CN      101977986 A        2/2011
(Continued)

OTHER PUBLICATIONS

International Search Report issued Aug. 31, 2021 in International Application No. PCT/JP2021/026746.
(Continued)

*Primary Examiner* — Brian A Mccaig
(74) *Attorney, Agent, or Firm* — Sughrue Mion, PLLC

(57)          ABSTRACT

An oxygen-absorbing film including at least, from an outer layer side, a surface substrate layer having an oxygen barrier property, an oxygen-absorbing resin layer, and an inner surface substrate layer that contains a stretched PET substrate and is heat-sealable. The surface substrate layer, the oxygen-absorbing resin layer, and the inner surface substrate layer are laminated in this order. The oxygen-absorbing film provides an oxygen-absorbing film suitable as a packaging material that excels in oxidation suppression of packaging contents and in non-sorption of aroma components and also exhibits excellent tearability.

5 Claims, 1 Drawing Sheet

(51) Int. Cl.

| | |
|---|---|
| *B32B 7/12* | (2006.01) |
| *B32B 15/09* | (2006.01) |
| *B32B 15/20* | (2006.01) |
| *B32B 27/08* | (2006.01) |
| *B32B 27/36* | (2006.01) |
| *B65D 65/40* | (2006.01) |

(52) U.S. Cl.
CPC ................ *B32B 7/12* (2013.01); *B32B 15/09* (2013.01); *B32B 15/20* (2013.01); *B32B 27/08* (2013.01); *B32B 27/36* (2013.01); *B65D 65/40* (2013.01); *B32B 2250/04* (2013.01); *B32B 2255/06* (2013.01); *B32B 2255/26* (2013.01); *B32B 2307/31* (2013.01); *B32B 2307/518* (2013.01); *B32B 2307/5825* (2013.01); *B32B 2307/702* (2013.01); *B32B 2307/704* (2013.01); *B32B 2307/7244* (2013.01); *B32B 2307/732* (2013.01); *B32B 2553/00* (2013.01); *B65D 2565/387* (2013.01)

(58) Field of Classification Search
CPC .......... B32B 7/028; B32B 7/12; B32B 15/09; B32B 15/20; B32B 27/08; B32B 27/36; B32B 2250/03; B32B 2250/04; B32B 2250/05; B32B 2250/244; B32B 2255/06; B32B 2255/10; B32B 2255/205; B32B 2255/26; B32B 2307/31; B32B 2307/514; B32B 2307/518; B32B 2307/5825; B32B 2307/702; B32B 2307/704; B32B 2307/724; B32B 2307/7244; B32B 2307/732; B32B 2307/7376; B32B 2307/74; B32B 2439/70; B32B 2553/00; B65D 65/40; B65D 81/264; B65D 2565/387
See application file for complete search history.

(56) References Cited

U.S. PATENT DOCUMENTS

| | | |
|---|---|---|
| 2005/0123698 A1 | 6/2005 | Kojima et al. |
| 2010/0317514 A1 | 12/2010 | Ohta et al. |
| 2014/0083890 A1 | 3/2014 | Ishizaki et al. |
| 2014/0308405 A1 | 10/2014 | Okada et al. |
| 2015/0353789 A1 | 12/2015 | Tadokoro et al. |
| 2019/0351651 A1 | 11/2019 | Ohsawa et al. |
| 2020/0039197 A1 | 2/2020 | Yasuda et al. |

FOREIGN PATENT DOCUMENTS

| | | |
|---|---|---|
| CN | 104968753 A | 10/2015 |
| JP | 6-220220 A | 8/1994 |
| JP | 11-302405 A | 11/1999 |
| JP | 2001-39475 A | 2/2001 |
| JP | 2001-329077 A | 11/2001 |
| JP | 2004-196951 A | 7/2004 |
| JP | 2007-522956 A | 8/2007 |
| JP | 2016-222284 A | 12/2016 |
| JP | 2018-12233 A | 1/2018 |
| JP | 2018-058973 A | 4/2018 |
| JP | 2018-154410 A | 10/2018 |
| JP | 2020-75406 A | 5/2020 |
| WO | 2005/007400 A2 | 1/2005 |
| WO | 2019/035409 A1 | 2/2019 |

OTHER PUBLICATIONS

International Preliminary Report on Patentability dated Mar. 28, 2023 with a Translation of the Written Opinion of the International Searching Authority in Application No. PCT/JP2021/026746.
Extended European Search Report dated Sep. 6, 2024 in application No. 21871953.2.
Communication issued Sep. 23, 2024 in Chinese Application No. 202180043497.3.
Japanese Office Action dated Jul. 15, 2025 in Application No. 2022-551156.
Communication dated Oct. 28, 2025 in Chinese Application No. 202180043497.3.

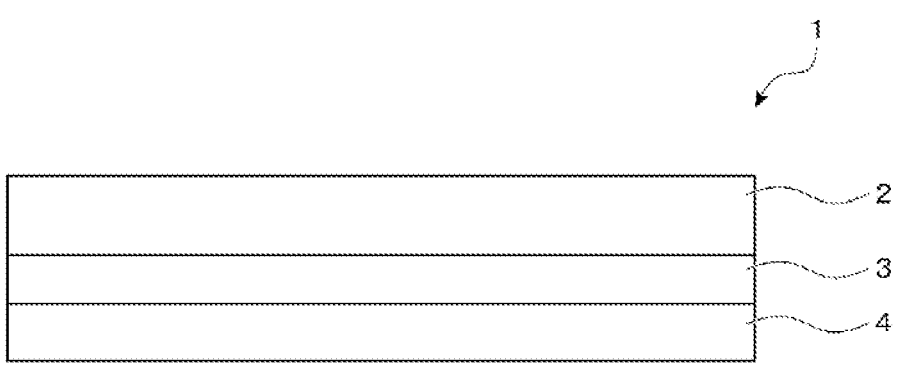

OXYGEN-ABSORBING FILM

CROSS REFERENCE TO RELATED APPLICATIONS

This application is a Rule 53(b) continuation of International Application No. PCT/JP2021/026746 filed Jul. 16, 2021, which claims priority to Japanese Patent Application Number 2020-162600 filed on Sep. 28, 2020. The contents of each of the above-identified applications are incorporated herein by reference in their entireties.

TECHNICAL FIELD

The disclosure relates to an oxygen-absorbing film.

BACKGROUND

So-called gas-replaced packaging into which contents are filled and the contents are sealed in the packaging body while air therein is replaced with an inert gas such as nitrogen in order to prevent alteration of the contents is known. During gas replacement, air is suctioned out of the packaging body as the packaging is filled with the contents, and the air in the packaging body is forcibly replaced by the inert gas. However, it is difficult to completely remove the oxygen in the packaging body even with a gas-replaced packaging. Therefore, for example, the applicant of the disclosure proposed, in JP 2001-039475 A, a packaging film having an oxygen absorption function.

SUMMARY

By using a packaging film having this type of oxygen absorption function and thereby enabling the removal of oxygen remaining in the packaging body after filling, issues such as alteration of the packaging target due to oxidation may be prevented, and the packaging target can be stored for a long period of time.

However, for example, in a case in which a preferential product such as coffee that also acts on the sense of smell is to be packaged, it is important to not only suppress alteration due to oxidation, but to also maintain the aroma components, and thus a demand exists for a packaging film that can prevent sorption of the aroma components by the packaging body.

Moreover, packaging films are used as packaging bags in various forms, and thus tearability when opening the packaging bag is also required. Ordinarily, for example, polyester films are used as a part of a multi-layered packaging body for food and pharmaceutical products. Thus, with attention focused on the issue of improving the tearability of this type of packaging body, various films are being proposed, such as a biaxially-stretched polyester film produced by mixing modified polybutylene terephthalate (PBT) with polyethylene terephthalate, a biaxially-stretched polyester film produced by mixing polycarbonate (PC) with polyethylene terephthalate, and a biaxially-stretched polyester film produced by mixing an acrylonitrile-styrene copolymer with polybutylene terephthalate (see JP 11-302405 A, JP 2001-329077 A, JP 6-220220 A, and JP 2004-196951 A). An improvement in tearability may be anticipated with each of these films, but because different types of thermoplastic resins are incompatibly blended, various issues exist, including, for example, the haze (cloudiness) of the film itself being high, resulting in reduced visibility of the contents, a single-layer film easily breaking when the film is stretched.

The present inventors arrived at the disclosure in light of circumstances such as those described above, and an object of the disclosure is to provide an oxygen-absorbing film that is suitable as a packaging material that excels in suppressing the oxidation of packaging contents and in non-sorption of aroma components and also exhibits excellent tearability.

An oxygen-absorbing film according to the disclosure is obtained by laminating, in the following order from an outer layer side, at least a surface substrate layer having an oxygen barrier property, an oxygen-absorbing resin layer, and an inner surface substrate layer that is heat-sealable and contains a stretched PET substrate.

According to the disclosure, an oxygen-absorbing film that is suitable as a packaging material that excels in suppressing the oxidation of packaging contents and in non-sorption of aroma components and also exhibits excellent tearability can be provided.

BRIEF DESCRIPTION OF DRAWINGS

The FIGURE is an explanatory view illustrating an example of an oxygen-absorbing film according to an embodiment of the disclosure.

DESCRIPTION OF EMBODIMENTS

An oxygen-absorbing film according to the disclosure will be described below with reference to embodiments.

An oxygen-absorbing film 1 according to the present embodiment includes at least, a surface substrate layer 2 having an oxygen barrier property, an oxygen-absorbing resin layer 3, and an inner surface substrate layer 4 containing a stretched PET substrate, the inner surface substrate layer being heat-sealable, the surface substrate layer, the oxygen-absorbing resin layer, and the inner surface substrate layer being laminated in this order. The oxygen-absorbing film 1 is suitably used as a packaging material that can be formed into a bag of a desired form according to the packaging target such that the surface substrate layer 2 is positioned at an outer layer side and the inner surface substrate layer 4 is positioned at an inner surface side. Examples of the bag form include a triangular pouch, a gusset pouch, a flat pouch, and a pillow form.

Surface Substrate Layer

For the surface substrate layer 2, from viewpoints such as scratch resistance and chemical resistance, preferably, for example, a biaxially-stretched film made of a polyester-based resin such as polyethylene terephthalate and a polyamide-based resin such as nylon is used as a substrate film. Further, a laminate film containing, for example, a coating layer containing, as a main agent, an oxygen barrier resin such as a polyvinyl alcohol-based resin, an ethylene-vinyl alcohol copolymer, a polyacrylic acid-based resin, or a vinylidene chloride-based resin, and a vapor-deposited thin-film of a metal or metal oxide of silica, alumina or the like, or a laminate film obtained by dry-laminating a metal foil such as an aluminum foil on the substrate film with a urethane-based adhesive or the like interposed therebetween is preferably used as the surface substrate. However, the surface substrate layer 2 is not limited thereto. In the surface substrate layer 2, various substrates having, in an environment of 25° C. and 90% RH, an oxygen permeability of less than 50 cc/(m²·day·atm) and more preferably less than 25 cc/(m²·day·atm) may be used for the surface substrate.

Oxygen-Absorbing Resin Layer

As the oxygen-absorbing resin used in the oxygen-absorbing resin layer 3, an oxygen-absorbing polyester-based resin including a functional group or bonding group having reactivity with oxygen in its structure is preferably used. Examples of functional groups or bonding groups having reactivity with oxygen include carbon-carbon double bond groups, aldehyde groups, and phenolic hydroxyl groups. In particular, an unsaturated polyester-based resin having a carbon-carbon double bond group is preferable, and a polyester-based resin having an unsaturated alicyclic structure is more preferable. A polyester-based resin having an unsaturated alicyclic structure is advantageous because the amount of low-molecular weight decomposition components generated as a by-product in an autoxidation reaction of the resin is suppressed.

Examples of polyester-based resins having an unsaturated alicyclic structure include polyesters obtained by using, as an acid component, tetrahydrophthalic acid or a derivative thereof or a tetrahydrophthalic anhydride or a derivative thereof in an acid component, and polymerizing the acid component with a diol component. When tetrahydrophthalic acid or a derivative thereof or a tetrahydrophthalic anhydride or a derivative thereof is used as the acid component, these may be esterified with a methyl ester or the like.

As the tetrahydrophthalic acid or derivative thereof or the tetrahydrophthalic anhydride or derivative thereof, 4-methyl-$\Delta^3$-tetrahydrophthalic acid or 4-methyl-$\Delta^3$-tetrahydrophthalic anhydride, or cis-3-methyl-$\Delta^4$-tetrahydrophthalic acid or cis-3-methyl-$\Delta^4$-tetrahydrophthalic anhydride is particularly preferable. These tetrahydrophthalic acids or derivatives thereof or tetrahydrophthalic anhydrides or derivatives thereof are highly reactive with oxygen, and therefore may be suitably used as acid components.

Note that these tetrahydrophthalic acids or derivatives thereof or tetrahydrophthalic anhydrides or derivatives thereof can be obtained by structural isomerization of an isomer mixture containing 4-methyl-$\Delta^4$-tetrahydrophthalic anhydride obtained by reacting a C5 fraction of naphtha containing isoprene and trans-piperylene as main components with maleic anhydride, and are industrially produced.

Examples of the diol component include ethylene glycol, diethylene glycol, triethylene glycol, polyethylene glycol, propylene glycol, dipropylene glycol, polypropylene glycol, trimethylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexanedimethanol, 2-phenylpropanediol, 2-(4-hydroxyphenyl) ethyl alcohol, $\alpha,\alpha$-dihydroxy-1,3-diisopropylbenzene, o-xylene glycol, m-xylene glycol, p-xylene glycol, $\alpha,\alpha$-dihydroxy-1,4-diisopropylbenzene, hydroquinone, 4,4-dihydroxydiphenyl, naphthalenediol, or derivatives thereof. An aliphatic diol such as diethylene glycol, triethylene glycol, and 1,4-butanediol is preferable, and 1,4-butanediol is more preferable. In a case in which 1,4-butanediol is used, an oxygen-absorbing polyester-based resin having high oxygen absorption performance and a minimal amount of decomposition products produced in the process of oxidation may be obtained. These diol components can be used alone or in a combination of two or more.

The oxygen-absorbing polyester-based resin may be copolymerized with other acid components or derivatives thereof, such as aromatic dicarboxylic acid, aliphatic dicarboxylic acid, and aliphatic hydroxycarboxylic acid contained in the raw material monomers, in addition to the tetrahydrophthalic acid or derivatives thereof or the tetrahydrophthalic anhydride or derivatives thereof.

Examples of aromatic dicarboxylic acids and derivatives thereof include benzenedicarboxylic acids such as phthalic acid, phthalic anhydride, isophthalic acid, and terephthalic acid; naphthalene dicarboxylic acids such as 2,6-naphthalene dicarboxylic acid; anthracene dicarboxylic acid, sulfoisophthalic acid, sodium sulfoisophthalate, or derivatives thereof. Among these, phthalic acid, phthalic anhydride, isophthalic acid, and terephthalic acid are preferable.

Examples of the aliphatic dicarboxylic acid and derivatives thereof include oxalic acid, malonic acid, succinic acid, succinic anhydride, glutaric acid, adipic acid, pimelic acid, suberic acid, azelaic acid, sebacic acid, undecanedioic acid, dodecanedioic acid, 3,3-dimethylpentanedioic acid, or derivatives thereof. Among these, succinic acid, succinic anhydride, adipic acid, and sebacic acid are preferable, and succinic acid is particularly preferable. Other examples include hexahydrophthalic acids having an alicyclic structure, dimer acids, and derivatives thereof.

Examples of aliphatic hydroxycarboxylic acids and derivatives thereof include glycolic acid, lactic acid, hydroxypivalic acid, hydroxycaproic acid, hydroxyhexanoic acid, or derivatives thereof.

These other acid components may be esterified as with, for example, dimethyl terephthalate and bis-2-hydroxydiethylterephthalate, or may be an acid anhydride such as phthalic anhydride or succinic anhydride. These other acid components can be used alone or as a combination of two or more.

By copolymerizing the other acid components, the glass transition temperature of the obtained oxygen-absorbing polyester-based resin may be easily controlled, and the oxygen absorption performance can be improved. Furthermore, the solubility of the oxygen-absorbing polyester-based resin in an organic solvent can be improved by controlling the crystallinity of the oxygen-absorbing polyester-based resin.

Also, the tetrahydrophthalic acid or derivative thereof or the tetrahydrophthalic anhydride or derivative thereof easily undergoes a radical crosslinking reaction due to heat during polymerization, and therefore another acid component can be blended therein to reduce the compositional ratio of the tetrahydrophthalic acid or derivative thereof or the tetrahydrophthalic anhydride or derivative thereof contained in the raw material monomers, and thereby gelling during polymerization can be suppressed, and a high molecular weight oxygen-absorbing polyester-based resin can be stably obtained.

The oxygen-absorbing polyester-based resin may further include a structural unit derived from a polyhydric alcohol, a polyvalent carboxylic acid, or derivatives thereof. The melt viscosity characteristics and the solution viscosity of the polyester dissolved in a solvent can be adjusted by introducing a polyhydric alcohol and a polyvalent carboxylic acid and controlling the branched structure.

Examples of the polyhydric alcohols and derivatives thereof include 1,2,3-propanetriol, sorbitol, 1,3,5-pentanetriol, 1,5,8-heptanetriol, trimethylolpropane, pentaerythritol, 3,5-dihydroxybenzyl alcohol, glycerin or derivatives thereof.

Examples of the polyvalent carboxylic acids and derivatives thereof include 1,2,3-propanetricarboxylic acid, meso-butane-1,2,3,4-tetracarboxylic acid, citric acid, trimellitic acid, pyromellitic acid, or derivatives thereof.

Furthermore, in a case in which a component having a trifunctional or higher functional group, such as a polyhydric alcohol or a polyvalent carboxylic acid, is to be copolymerized, the content is preferably within 5 mol % in relation to all of the acid components.

In the present embodiment, the oxygen-absorbing resin is preferably an oxygen-absorbing polyester-based resin obtained by using tetrahydrophthalic acid or a derivative thereof or a tetrahydrophthalic anhydride or derivative thereof as an acid component, 1,4-butanediol as a diol component, and succinic acid or a succinic anhydride as another acid component, and copolymerizing these components.

In this case, the proportion of structural units derived from the tetrahydrophthalic acid or derivative thereof or the tetrahydrophthalic anhydride or derivative thereof contained in the oxygen-absorbing polyester-based resin is preferably from 70 to 95 mol %, more preferably from 75 to 95 mol %, and even more preferably from 80 to 95 mol % in relation to all of the acid components.

Furthermore, the proportion of the structural units derived from succinic acid or succinic anhydride is preferably from 0 to 15 mol %, more preferably from 0 to 12.5 mol %, and more preferably from 0 to 10 mol % in relation to all of the acid components.

By adopting such a compositional ratio, an oxygen-absorbing resin that exhibits excellent oxygen absorption performance and adhesiveness, as well as excellent solubility in an organic solvent can be obtained.

The oxygen-absorbing polyester-based resin can be synthesized, for example, by interfacial polycondensation, solution polycondensation, melt polycondensation or solid-phase polycondensation. At this time, a polymerization catalyst is not necessarily required, but, for example, a normal polyester polymerization catalyst such as a titanium-based, germanium-based, antimony-based, tin-based, or aluminum-based polyester polymerization catalyst can be used. Known polymerization catalysts such as nitrogen-containing basic compounds, boric acid and borates, and organic sulfonic acid-based compounds can also be used. Furthermore, various additives such as an antioxidant or a coloration inhibitor such as a phosphorus compound can be added during polymerization. By adding an antioxidant, oxygen absorption during polymerization or subsequent processing can be suppressed, and thus gelling or a reduction in the performance of the oxygen-absorbing resin can be suppressed.

Also, when polymerization is to be implemented, the polymerization conditions such as the compositional ratio of the raw material monomers and the molecular weight are preferably adjusted, as appropriate, such that under conditions including a temperature of 220° C., the melt viscosity at a shear rate of 100 s$^{-1}$ is less than 90 Pa·s, preferably less than 60 Pa·s, and more preferably less than 30 Pas. Favorable coatability can be exhibited by suppressing the melt viscosity to a low level, and any material strength can be achieved by blending a curing agent, and therefore the oxygen-absorbing resin can be suitably used as a solvent-soluble type dry laminate.

The number average molecular weight of the oxygen-absorbing polyester-based resin is preferably from 500 to 100000, and more preferably from 2000 to 10000. The weight average molecular weight is preferably from 5000 to 200000, more preferably from 10000 to 100000, and even more preferably from 20000 to 70000. When the molecular weight is lower than the above range, the cohesive force, that is, the creep resistance of the resin, decreases, and if the molecular weight is higher than the above range, a decrease in solubility in an organic solvent and a decrease in coatability due to an increase in solution viscosity occur, and thus a molecular weight outside of the range described above is not preferable.

The glass transition temperature of the oxygen-absorbing polyester-based resin is preferably from −20° C. to 10° C., more preferably from −15° C. to 6° C., and even more preferably from −12° to 2° C. Sufficient oxygen absorption performance can be obtained by setting the glass transition temperature to this range.

In order to obtain sufficient oxygen absorption performance, the acid value of the oxygen-absorbing polyester-based resin is preferably 5 mg KOH/g or less, and more preferably 1 mg KOH/g or less. If the acid value is greater than 5 mg KOH/g, a rapid autoxidation reaction may be hindered, and stable oxygen absorption performance may not be obtained.

Note that the method for measuring the acid value of the oxygen-absorbing polyester-based resin is in accordance with JIS K 0070.

Also, when the oxygen-absorbing polyester-based resin is used as a solvent-soluble dry laminate adhesive, the laminate strength may decrease due to internal stresses generated in association with the oxygen absorption reaction (oxidation curing reaction). In order to suppress this, a component having a low glass transition temperature and containing a saturated polyester resin as a main component may be compounded. Through the flexibility of such components, these components can mitigate the internal stresses generated in association with the oxidation curing reaction.

The saturated polyester resin is a polyester resin that substantially does not contain a carbon-carbon double bond group, and can be obtained, for example, by polycondensation of a dicarboxylic acid component with a diol component and a hydroxycarboxylic acid component. The saturated polyester resin is preferably a polyester having an iodine value of 3 g/100 g or less, and is particularly preferably a polyester having an iodine value of 1 g/100 g or less. When the iodine value of the saturated polyester resin exceeds 3 g/100 g, a low molecular weight decomposition component is easily generated in association with the oxygen absorption reaction of the oxygen-absorbing resin, and thus such a saturated polyester resin is not preferable.

Note that the method for measuring the iodine value is in accordance with JIS K 0070.

Examples of the dicarboxylic acid component include the aromatic dicarboxylic acids, aliphatic dicarboxylic acids, hexahydrophthalic acids, dimer acids, and derivatives thereof, which are exemplified as components of the oxygen-absorbing polyester-based resin described above. These can be used alone or in a combination of two or more.

Examples of the diol component include the diols exemplified as a component of the oxygen-absorbing polyester-based resin described above. These can be used alone or in a combination of two or more.

Examples of the hydroxycarboxylic acid component include the aliphatic hydroxycarboxylic acids exemplified as components of the oxygen-absorbing polyester-based resin described above.

The glass transition temperature of the saturated polyester resin is preferably −10° C. or lower, more preferably from −70° C. to −15° C., and even more preferably from −60° C. to −20° C. By setting the glass transition temperature to such a range, the internal stress generated by the oxidation curing reaction in association with oxygen absorption can be effectively mitigated.

A ratio A/B of an oxygen-absorbing polyester-based resin (A) to a saturated polyester resin (B) is preferably from 0.6 to 9, more preferably from 1 to 9, and even more preferably from 2 to 9. By setting the ratio A/B to be within such a range, a strong laminate strength can be maintained before and after oxygen absorption while exhibiting excellent oxygen absorption performance.

In order to promote an oxygen absorption reaction, a transition metal catalyst may be added to the oxygen-absorbing resin layer 3 formed using an oxygen-absorbing resin like that described above. Examples of the transition metal catalyst include transition metals such as manganese, iron, cobalt, nickel, copper, silver, tin, titanium, zirconium, vanadium, and chromium, and particularly preferable examples include inorganic salts, organic salts, or complex salts of transition metals such as manganese, iron, cobalt, nickel and copper. More specifically, examples of the transition metal catalyst include transition metal salts formed from an organic acid and a transition metal selected from manganese, iron, cobalt, nickel and copper. In particular, from the perspective of promoting the oxygen absorption reaction of the oxygen-absorbing resin and increasing oxygen absorbency, the transition metal catalyst is preferably an organic acid salt of manganese, iron, or cobalt, and is particularly preferably an organic acid salt of cobalt. The content of the transition metal catalyst in the oxygen-absorbing resin layer 3 is, in terms of the metal, preferably from 1 ppm to 1000 ppm, more preferably from 10 ppm to 500 ppm, and even more preferably from 20 ppm to 300 ppm.

In addition, when the oxygen-absorbing resin layer 3 is to be formed, the oxygen-absorbing resin is preferably prepared so as to be dissolved in an organic solvent and used as a dry-laminate adhesive. Examples of the organic solvent include ethyl acetate, acetone, methyl ethyl ketone, methyl isobutyl ketone, toluene, xylene, and isopropanol. In particular, ethyl acetate has relatively few issues in terms of offensive odors attributed to the residual solvent, and therefore ethyl acetate is generally used as a solvent for an adhesive used to dry laminate a flexible packaging. Further, in consideration of industrial applications, use of ethyl acetate as a single solvent not containing toluene, xylene or the like is preferable.

When an oxygen-absorbing polyester-based resin is to be used, such a resin can be compounded with an isocyanate-based curing agent and then used as a two-part curable adhesive. When the isocyanate-based curing agent is compounded, the adhesive strength and cohesive force increase, and curing can be implemented at a low temperature near room temperature.

Examples of the isocyanate-based curing agent include aliphatic isocyanate-based curing agents such as xylylene diisocyanate (XDI), hexamethylene diisocyanate (HDI), lysine diisocyanate, lysine methyl ester diisocyanate, trimethylhexamethylene diisocyanate, and n-pentane-1,4-diisocyanate, and alicyclic isocyanate-based curing agents such as isophorone diisocyanate (IPDI), cyclohexane-1,4-diisocyanate, methylcyclohexyl diisocyanate, and dicyclohexylmethane-4,4'-diisocyanate. Among these, XDI and HDI are preferable as the aliphatic isocyanate-based curing agent, and IPDI is preferable as the alicyclic isocyanate-based curing agent. XDI is particularly preferable. The most excellent oxygen absorption performance is exhibited when XDI is used.

These aliphatic and/or alicyclic isocyanate-based curing agents are preferably used as a polyisocyanate compound having increased molecular weight, such as an adduct, an isocyanurate, and a biuret.

Furthermore, a single type of these aliphatic and/or alicyclic isocyanate-based curing agents may be used alone, or two or more types may be used in combination.

In terms of parts by weight of the solid content, the isocyanate-based curing agent is added to the oxygen-absorbing polyester-based resin, which is the main agent, at an amount of preferably from 3 phr to 30 phr, more preferably from 3 phr to 20 phr, and even more preferably from 3 phr to 15 phr. When the added amount is too small, the adhesiveness and cohesive force become insufficient, and if the added amount is too large, the blended amount of the oxygen absorbing component contained in the unit weight of the resin composition is reduced, and the oxygen absorption performance becomes insufficient. Furthermore, when the motility of the resin is significantly reduced by curing, the oxygen absorption reaction is less likely to proceed, and the oxygen absorption performance decreases.

Inner Surface Substrate Layer

In order to obtain an oxygen-absorbing film that excels in tearability and non-sorption of aroma components, the inner surface substrate layer 4 is preferably formed using, as a surface substrate, a surface substrate that is heat-sealable by laminating a heat-sealable polyester-based resin layer to an inner surface side of a stretched PET substrate, or a surface substrate that is heat-sealable by converting, in at least the heat-sealing region of the stretched PET substrate, all of the stretched PET substrate in the thickness direction to an amorphous or low crystalline form. For example, a general-purpose heat-sealing agent having a polyolefin-based resin as a main raw material can be applied on a thin film on one side on a stretched PET substrate to enable heat sealing, but such a configuration is inferior in non-sorption, and thus is insufficient.

Note that the inner surface side of the stretched PET substrate refers to a surface side of the side opposite the surface facing the oxygen-absorbing resin layer 3, and the heat-sealing region refers to a portion that is heat-sealed when a bag is to be manufactured in a desired form as described above.

Regarding such an inner surface substrate layer 4, first an aspect including a stretched PET substrate and a heat-sealable polyester-based resin layer laminated on an inner surface side of the stretched PET substrate is described.

As the stretched PET substrate, a stretched and oriented polyethylene terephthalate film is preferably used, and a biaxially-stretched polyethylene terephthalate film is particularly preferably used. The stretched PET substrate is made from a polyethylene terephthalate resin, but for reasons such as controlling the film moldability and crystallinity, the stretched PET substrate is preferably formed from a polyethylene terephthalate resin in which around 0.1 to 3 mol % of the terephthalic acid of the acid component is modified with isophthalic acid. The thickness of the stretched PET substrate is not particularly limited as long as the stretched PET substrate has a desired oxygen permeability so as not to inhibit the oxygen absorption function of the oxygen-absorbing resin layer 3, but in order to achieve high oxygen permeability while maintaining handling properties, the thickness of the stretched PET substrate is preferably from 6 to 20 μm, more preferably from 6 to 16 μm, and even more preferably from 7 to 14 μm.

From the perspective of non-sorption of aroma components, the heat-sealable polyester-based resin layer is preferably formed using a heat-sealable copolyester. In particular, the heat-sealable polyester-based resin layer is preferably formed using a copolyester obtained by copolymerizing at least one type of acid component selected from the group consisting of terephthalic acid, isophthalic acid, and adipic acid, and at least one type of diol component selected from the group consisting of ethylene glycol, diethylene glycol, neopentyl glycol, propylene glycol, butanediol, and 1,4-cyclohexanedimethanol. At this time, with a polyester obtained by copolymerizing isophthalic acid with terephthalic acid as acid components, the glass transition temperature is high, and thus non-sorption of aroma components is also excellent, and furthermore, through copolymerization, the crystallization degree of the resin can be controlled to a low level, resulting in an amorphous form, and therefore the heat sealing property is also excellent. Thus, such a polyester is particularly preferable.

Examples of the heat-sealable copolyester include, but are not particularly limited to, a copolyester formed from the three components of terephthalic acid, ethylene glycol, and neopentyl glycol, a copolyester formed from the three components of terephthalic acid, isophthalic acid, and ethylene glycol, a copolyester formed from the three components of terephthalic acid, isophthalic acid, and propylene glycol, a copolyester formed from the three components of terephthalic acid, ethylene glycol, and 1,4-cyclohexanedimethanol, a copolyester formed from the four components of terephthalic acid, isophthalic acid, ethylene glycol, and neopentyl glycol, and a copolyester formed from the four components of terephthalic acid, isophthalic acid, ethylene glycol, and diethylene glycol.

Such a copolyester exhibits a heat-sealing property and non-sorption of aroma components and also has a moderate level of oxygen permeability. Therefore, such a copolyester exhibits a high level of adhesiveness with the stretched PET substrate without inhibiting the oxygen-absorbing function of the oxygen-absorbing resin layer 3, and thus an adhesive layer between the stretched PET substrate and the heat-sealable polyester-based resin layer can be omitted. Hence, such a copolyester is suitable as a resin for forming the heat-sealable polyester-based resin layer of the present aspect.

The thickness of the heat-sealable polyester-based resin layer is preferably from 0.1 to 5.0 μm, more preferably from 0.5 to 4.0 μm, and even more preferably from 0.5 to 3 μm. At this time, a higher level of heat seal strength can be expected as the thickness of the heat-sealable polyester-based resin layer is increased. However, when the heat-sealable polyester-based resin layer is made thinner than the thickness of the stretched PET substrate described above, excellent tearability and non-sorption of aroma components are exhibited, and thus such a thickness is particularly preferable.

A known method can be used to laminate the heat-sealable polyester-based resin layer on the inner surface side of the stretched PET substrate. For example, a method in which a coating agent in which the abovementioned resin is dissolved is coated onto one surface of the stretched PET substrate and dried, or a method in which a two-layer film including a PET resin and the above-described copolyester resin is produced by the T-die method, after which the two-layer film is moderately stretched uniaxially or biaxially to an extent at which the heat-sealing property stemming from the copolyester resin is not impaired can be used in production, but the method is not particularly limited thereto.

Next, an aspect is described in which the inner surface substrate layer 4 includes a stretched PET substrate, and in at least a heat-sealing region of the stretched PET substrate layer, the stretched PET substrate in the thickness direction is entirely converted to an amorphous or low crystalline form.

As the stretched PET substrate, the same material as that of the aspect described above can be used, and thus redundant descriptions are omitted. The stretched and oriented polyethylene terephthalate film has high crystallinity due to oriented crystallization and does not have a heat sealing property. However, the film surface may be preheated as necessary, scanned and irradiated with a UV laser or an infrared laser beam, and then quenched immediately after the completion of scanning can selectively cause a portion of the film to be converted to an amorphous or low crystallized form and impart a heat sealing property. Through this, the resulting material can be used as an inner surface substrate that contains a stretched PET substrate and forms a heat-sealable inner surface substrate layer 4. Such aspects are particularly preferable because of the non-sorption property of the polyethylene terephthalate resin itself.

The crystallinity of the untreated stretched PET region and the amorphous to low-crystallized PET region can be measured by a known method. For example, in addition to the general method for measuring density (density obtained by the density gradient tube method), a method disclosed in JP H07-80502 B of measuring the density distribution by the laser Raman method and then determining the crystallinity from a conversion equation can be used.

In the present aspect, if at least the heat-sealing region of the stretched and oriented polyethylene terephthalate film is converted to an amorphous or low crystallized form, only the portion necessary for heat sealing is treated, and therefore the treatment time can be shortened, and the remaining untreated portions excel in non-sorption stemming from the stretched PET substrate and also exhibit high crystallinity and excellent tearability, and thus such an aspect is preferable. The treatment methods described in, for example, JP 2016-000796 A and JP 2020-189892 A can be used to convert at least the heat-sealing region of the stretched and oriented polyethylene terephthalate film to an amorphous or low crystallized form.

In addition, when these treatment methods are applied, and at least the heat-sealing region of the stretched PET substrate is converted to an amorphous or low crystallized form, as necessary, the stretched PET substrate can also be treated after the stretched PET substrate and other layers have been laminated.

In this manner, the inner surface substrate layer 4 in the present embodiment can be an aspect including the stretched PET substrate and a heat-sealable polyester-based resin layer laminated on an inner surface side of the stretched PET substrate, or an aspect in which the inner surface substrate layer 4 includes the stretched PET substrate, and in at least the heat-sealing region of the stretched PET substrate, the stretched PET substrate in the thickness direction is converted entirely to an amorphous or low crystalline form. Furthermore, in either aspect, to ensure that the oxygen-absorbing function of the oxygen-absorbing resin layer 3 is not inhibited, the oxygen permeability of the inner surface substrate layer 4 in an environment at 25° C. and 60% RH is preferably 50 cc/(m$^2$·day·am) or higher, more preferably 80 cc/(m$^2$·day·atm) or higher, and even more preferably 100 cc/(m$^2$·day·atm) or higher.

In the present embodiment, the oxygen-absorbing film 1 can be manufactured by dry laminating the inner surface substrate forming the inner surface substrate layer 4 to the surface substrate forming the surface substrate layer 2 using a dry laminate adhesive containing an oxygen-absorbing resin prepared as described above. In this case, a known dry laminator can be used. For example, the oxygen-absorbing resin layer 3 formed from an oxygen-absorbing adhesive resin contained in a dry laminate adhesive between a surface substrate and an inner surface substrate can be formed by passing through a series of lamination steps including applying a dry laminate adhesive containing an oxygen-absorbing resin onto the surface substrate, passing the coated surface substrate through a drying oven to volatilize the organic solvent, and then affixing the inner surface substrate to the surface substrate using a nip roll that has been heated to a temperature of from 50 to 120° C. Through this, the oxygen-absorbing film 1 obtained by laminating the surface substrate layer 2 having an oxygen barrier property, the oxygen-absorbing resin layer 3, and the inner surface substrate layer 4 in this order can be produced.

When the oxygen-absorbing film 1 is produced in this manner, the coating amount of the dry laminate adhesive including the oxygen-absorbing resin is, in terms of solid content, preferably from 0.1 to 30 g/m², more preferably from 1 to 15 g/m², and even more preferably from 2 to 10 g/m².

The heat seal strength of the oxygen-absorbing film 1 is not particularly limited as long as the heat seal interface is melted and sufficiently sealed, but, for example, the heat seal strength is, as a lower limit, preferably 1 N/15 mm or higher and more preferably 2 N/15 mm or higher. At this time, a higher heat seal strength is generally more preferable, and the oxygen-absorbing film 1 can be suitably used when the packaging target is a relatively lightweight food or pharmaceutical product.

However, when the heat seal strength is too high, the package becomes difficult to open, and therefore the upper limit of the heat seal strength is, for example, preferably not greater than 12 N/15 mm, more preferably not greater than 9 N/15 mm, and particularly preferably not greater than 7 N/15 mm.

According to the present embodiment as described above, an oxygen-absorbing film 1 that is suitable as a packaging material that excels in suppressing the oxidation of packaging contents and in non-sorption of aroma components and also exhibits excellent tearability can be provided.

Also, when an oxygen-absorbing polyester-based resin is used as the oxygen-absorbing resin and is prepared and used as a dry laminate adhesive, as described above, the laminate strength may decrease due to internal stresses generated in association with the oxygen absorption reaction. When the laminate strength decreases and delamination occurs during tearing, it may be difficult to tear the film, but this type of difficulty can be effectively avoided by adopting a configuration in which the inner surface substrate layer 4 contains the stretched PET substrate.

EXAMPLES

The disclosure will be described in greater detail with reference to specific examples.

Example 1

A reaction vessel was charged with a methyl tetrahydrophthalic anhydride isomer mixture (HN-2200, available from Hitachi Chemical Co., Ltd.) as an acid component at a molar ratio of 0.9 and with succinic anhydride as another acid component at a molar ratio of 0.1, 1,4-butanediol as a diol component at a molar ratio of 1.3, and isopropyl titanate as a polymerization catalyst at a compositional ratio of 300 ppm, and the contents of the reaction kettle were allowed to react at a temperature of 150° C. to 200° C. in a nitrogen atmosphere for 6 hours while removing the water that was produced. Subsequently, polymerization was implemented for approximately 3 hours at a temperature of from 200 to 220° C. at a reduced pressure of 0.1 kPa, and an oxygen-absorbing polyester-based resin (A) was obtained. The number average molecular weight (Mn) of the oxygen-absorbing polyester-based resin (A) was 3400, the weight average molecular weight (Mw) was 52600, and the glass transition temperature (Tg) was −5.0° C.

A saturated polyester resin (B) (Polysizer W4010, available from DIC Corporation, Mn: 3600, Mw: 9500) having a Tg of −26° C. was mixed into the obtained oxygen-absorbing polyester-based resin (A) such that the solid content weight ratio A/B became 4.0, after which an HDI/IPDI-based curing agent (KL-75, available from DIC Graphics Corporation) was mixed as an isocyanate-based curing agent into the solid content of the mixture so as to become, in terms of solid content, 7 parts per hundred resin (phr). Furthermore, cobalt neodecanoate was added as a catalyst such that the metal equivalent amount in relation to the total solid content was 80 ppm, and the mixture was dissolved in ethyl acetate to thereby prepare a dry laminate adhesive containing an oxygen-absorbing resin at a solid content concentration of 32 wt %.

Next, a surface substrate was prepared by dry laminating an aluminum foil having a thickness of 7 μm onto a biaxially-stretched PET film with a thickness of 12 μm with a urethane-based adhesive interposed therebetween. In addition, an inner surface substrate (oxygen permeability at 25° C. and 60% RH of 130 cc/(m²·day·atm)) was prepared by laminating, onto one side of a biaxially-stretched PET film (stretched PET substrate) with a thickness of 12 μm, a heat-sealable polyester-based resin layer at a thickness of 1 μm, the heat-sealable polyester-based resin layer being formed from a copolyester in which the acid components were terephthalic acid and isophthalic acid, and the diol components were ethylene glycol and neopentyl glycol (copolymerization ratio: terephthalic acid 29 mol %, isophthalic acid 21 mol %, ethylene glycol 28 mol %, neopentyl glycol 22 mol %). The prepared surface substrate and inner surface substrate were then placed as a set in a dry laminator.

Furthermore, the dry laminate adhesive described above was applied to the aluminum foil side of the surface substrate at a coating amount of 5 g/m² and then dry-laminated to the stretched PET side of the inner surface substrate. The resulting product was stored for 5 days in a nitrogen atmosphere at a temperature of 35° C., and thereby an oxygen-absorbing film 1 was obtained with a layered structure formed from the surface substrate layer (biaxially-stretched PET film/urethane-based adhesive/aluminum foil) 2/the oxygen-absorbing resin layer 3/and the inner surface substrate layer (biaxially-stretched PET film/heat-sealable polyester-based resin layer) 4.

The oxygen permeability of the inner surface substrate was measured by cutting the inner surface substrate to a size of 50.2 cm², attaching the sample to a mixed gas permeation device (GTR-20XFTSK flow type water vapor permeation rate measuring device, available from GTR Tec Corporation), and then measuring the oxygen permeability in an atmosphere having a temperature of 25° C. and a humidity of 60% RH at an oxygen test gas flow rate of 40 mL/min and a helium gas flow rate of 5 mL/min.

The (a) oxygen absorption performance, the (b) tear strength, and the (c) non-sorption property of the obtained oxygen-absorbing film 1 were evaluated as follows. The results are shown in Table 1.

(a) Oxygen Absorption Performance

A test piece was cut from the oxygen-absorbing film 1 at a size of 2 cm×15 cm and was inserted into an oxygen-impermeable steel foil laminated cup having an internal volume of 85 cm³. A humidity control liquid formed from an aqueous glycerin solution was also inserted into the cup, and the cup was heat sealed with an aluminum foil-laminated film lid and stored in an atmosphere at 25° C. The humidity inside the cup was controlled to 60% RH by the humidity control liquid, and the oxygen concentration in the cup after 28 days of storage was measured using a micro-gas chromatograph instrument (3000 MICRO GC, available from Inficon, Inc.). The oxygen absorption amount per 1 cm² of film was calculated, and after 28 days of storage, an oxygen absorption amount of 0.030 mL/cm² or higher was considered to be good, and an oxygen absorption amount of less than 0.030 mL/cm² was considered to be poor.

(b) Tear Strength

A test piece of a size of 150 mm×50 mm was cut from the oxygen-absorbing film 1, and the tear strength (unit: N) was measured by the trouser method in accordance with JIS K 7128-1 in an atmosphere having a temperature of 23° C. and a humidity of 50% RH. Namely, the rectangular test piece was slit halfway in the longitudinal direction to obtain a trouser-shaped test piece, the long legs of the trouser-shaped test piece were attached to a precision tensile tester (Autograph Universal Testing Machine AG-IS, available from Shimadzu Corporation), and the tear strength was measured sorption amounts of the three components was less than 10, and was considered to be poor when the total was 10 or higher.

(d) Heat Seal Strength

A heat seal tester (available from Tester Sangyo Co., Ltd.) was used with the seal time fixed at 1 second, the seal pressure fixed at 2 kgf/cm², and the sealing temperature setting set to a range from 110° C. to 190° C., and a test piece for measurement was prepared while measuring the temperature of the seal interface. The heat seal strength was measured using the precision Autograph Universal Testing Machine AG-IS (available from Shimadzu Corporation) in an environment of 23° C. and 50% RH in accordance with JIS-Z1707. The test piece was pulled in the film flow direction (MD) at a rate of 300 mm/min, and the maximum test force (N/15 mm width) was measured as the heat seal strength. The maximum value of the seal strength within the seal temperature range described above was used as the heat seal strength.

TABLE 1

| | Tear Strength [N] | | | | Sorption Amount (relative value) | | | | | (d) |
|---|---|---|---|---|---|---|---|---|---|---|
| | (a) | MD | TD | (b) | dl-camphor | l-menthol | Methyl salicylate | Total Amount | (c) | [N/15 mm] |
| Example 1 | Good | 0.01 | 0.10 | Good | 2.6 | 1.2 | 0.6 | 4.3 | Good | 3.3 |
| Example 2 | Good | 0.01 | 0.11 | Good | 4.0 | 2.2 | 1.3 | 7.5 | Good | 6.6 |
| Example 3 | Good | 0.01 | 0.08 | Good | 1.0 | 1.0 | 1.0 | 3.0 | Good | 10.5 |
| Example 4 | Good | 0.01 | 0.10 | Good | 2.6 | 1.2 | 0.6 | 4.3 | Good | 3.3 |
| Example 5 | Good | 0.01 | 0.11 | Good | 4.0 | 2.2 | 1.3 | 7.5 | Good | 6.6 |
| Example 6 | Good | 0.01 | 0.08 | Good | 1.0 | 1.0 | 1.0 | 3.0 | Good | 10.5 |
| Comparative Example 1 | Good | 0.33 | 0.37 | Poor | 4.3 | 2.4 | 1.4 | 8.1 | Good | 17.7 |
| Comparative Example 2 | Good | — | — | — | 23.3 | 9.1 | 4.4 | 36.8 | Poor | 17.5 | at a tear speed of 200 mm/min as a measurement condition. The average tear strength along a length of 50 mm remaining after excluding the first 20 mm of tearing and the last 5 mm of tearing was used as the tear strength. A tear strength in the MD (flow direction) and the TD (vertical direction) of less than 0.2 N was considered to be good, and a tear strength of 0.2 N or higher was considered to be poor.

(c) Non-Sorption Property

A test piece of a size of 5 cm×4 cm was cut from the oxygen-absorbing film 1, and a heat seal layer 5 side was brought into contact with a Salonpas Ae (available from Hisamitsu Pharmaceutical Co., Inc.) and then returned in that state to the original individual product package bag, and the package bag was then heat sealed and allowed to stand for two weeks in an environment having a temperature of 22° C. Subsequently, the test piece alone was removed and then inserted and sealed in a glass vial, and the sorption components volatilized by heating for 30 minutes at 80° C. were quantitatively measured using a gas chromatograph with a headspace sampler (6890 Series GC System, available from Agilent Technologies, Inc., detector: FID). The measurement target included the three components of dl-camphor, l-menthol, and methyl salicylate, and the sorption amounts of these components in each sample were calculated as relative values when the adsorption amount by a commercially available 12 µm stretched PET film was considered to be 1. The non-sorption property was considered to be good when the total of the relative values of the Example 2

An oxygen-absorbing film 1 was obtained in the same manner as in Example 1 with the exception of the use of, as the inner surface substrate, an inner surface substrate (oxygen permeability at 25° C. and 60% RH of 140 cc/(m²·day·atm)) that was obtained by laminating, onto one side of a biaxially-stretched PET film (stretched PET substrate) with a thickness of 9 µm, a heat-sealable polyester-based resin layer at a thickness of 3 µm, the heat-sealable polyester-based resin layer being formed from a copolyester in which the acid components were terephthalic acid and isophthalic acid, and the diol components were ethylene glycol and diethylene glycol (copolymerization ratio: terephthalic acid 41 mol %, isophthalic acid 9 mol %, ethylene glycol 48 mol %, diethylene glycol 2 mol %). The (a) oxygen absorption performance, (b) tear strength, and (c) non-sorption property of the obtained oxygen-absorbing film 1 were evaluated. The results are collectively shown in Table 1.

Example 3

An oxygen-absorbing film 1 was obtained in the same manner as in Example 1 with the exception of using an inner surface substrate in which, with regard to the stretched PET substrate with a thickness of 12 µm, only the heat-sealing region of the stretched PET substrate was converted to an amorphous form in the entire thickness direction using a carbon dioxide gas laser oscillator (wavelength of 10.6 μm) with the output set to 35 W, the spot diameter on the irradiation surface set to approximately 2.7 mm, the interval between scanning lines set to 1100 μm, and the scanning speed set to 540 mm/second. The (a) oxygen absorption performance, (b) tear strength, and (c) non-sorption property of the obtained oxygen-absorbing film were evaluated. The results are collectively shown in Table 1.

Note that in the evaluations, the test pieces were cut out from a region other than the heat-sealing region.

Example 4

An oxygen-absorbing film 1 was obtained in the same manner as in Example 1 with the exception that the HDI/IPDI-based curing agent (KL-75, available from DIC Graphics Corporation) was mixed as an isocyanate-based curing agent into the oxygen-absorbing polyester-based resin (A) such that the solid content of the HDI-IPDI-based curing agent became 10 phr, and a dry-laminate adhesive containing an oxygen-absorbing resin was prepared. The (a) oxygen absorption performance, (b) tear strength, and (c) non-sorption property of the obtained oxygen-absorbing film 1 were evaluated. The results are collectively shown in Table 1.

Example 5

An oxygen-absorbing film 1 was obtained in the same manner as in Example 2 with the exception that a dry laminate adhesive containing the oxygen-absorbing resin prepared in Example 4 was used. The (a) oxygen absorption performance, (b) tear strength, and (c) non-sorption property of the obtained oxygen-absorbing film 1 were evaluated. The results are collectively shown in Table 1.

Example 6

An oxygen-absorbing film 1 was obtained in the same manner as in Example 3 with the exception that a dry laminate adhesive containing the oxygen-absorbing resin prepared in Example 4 was used. The (a) oxygen absorption performance, (b) tear strength, and (c) non-sorption property of the obtained oxygen-absorbing film 1 were evaluated. The results are collectively shown in Table 1.

Comparative Example 1

An oxygen-absorbing film 1 was obtained in the same manner as in Example 1 with the exception that an unstretched isophthalic acid-modified PET film (Fine Cast Film, available from Toyo Kohan Co., Ltd.) having a thickness of 17 μm was used as the inner surface substrate. The (a) oxygen absorption performance, (b) tear strength, and (c) non-sorption property of the obtained oxygen-absorbing film 1 were evaluated. The results are collectively shown in Table 1.

Comparative Example 2

An oxygen-absorbing film 1 was obtained in the same manner as in Example 1 with the exception that an amorphous PET film (Hitoron PG, available from Tamapoly Co., Ltd.) made of a cyclohexanedimethanol-modified polyethylene terephthalate resin having a thickness of 30 μm was used as the inner surface substrate. The (a) oxygen absorption performance and (c) non-sorption property of the obtained oxygen-absorbing film 1 were evaluated. The results are collectively shown in Table 1.

Although the disclosure has been described above with reference to the preferred embodiments, the disclosure is not limited only to the embodiments described above, and various modifications can be made within the scope of the disclosure.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An oxygen-absorbing film comprising at least, from an outer layer side, a surface substrate layer having an oxygen barrier property, an oxygen-absorbing resin layer, and an inner surface substrate layer containing a stretched PET substrate, the inner surface substrate layer being heat-sealable, the surface substrate layer, the oxygen-absorbing resin layer, and the inner surface substrate layer being laminated in this order, wherein the inner surface substrate layer comprises the stretched PET substrate and a heat-sealable polyester-based resin layer, the heat-sealable polyester-based resin layer being laminated on an inner surface side of the stretched PET substrate.

2. The oxygen-absorbing film according to claim 1, wherein a thickness of the heat-sealable polyester-based resin layer is from 0.1 to 5.0 μm.

3. The oxygen-absorbing film according to claim 1, wherein the heat-sealable polyester-based resin layer comprises a copolyester.

4. The oxygen-absorbing film according to claim 1, wherein the heat-sealable polyester-based resin layer comprises a copolyester obtained by copolymerizing at least one type of acid component selected from the group consisting of terephthalic acid and isophthalic acid, and at least one type of diol component selected from the group consisting of ethylene glycol, diethylene glycol, neopentyl glycol, propylene glycol, butanediol, and 1,4-cyclohexanedimethanol.

5. The oxygen-absorbing film according to claim 1, wherein an oxygen permeability of the inner surface substrate layer in an environment at 25° C. and 60% RH is 50 cc (m2·day·atm) or higher.

* * * * *